(12) United States Patent
Sakaguchi

(10) Patent No.: US 7,716,984 B2
(45) Date of Patent: May 18, 2010

(54) ACCELERATION SENSOR DEVICE HAVING PIEZO-RESISTORS MEASURING ACCELERATION

(75) Inventor: Isao Sakaguchi, Kamisato-machi (JP)

(73) Assignee: Hitachi Metal Ltd. (JP)

( * ) Notice: Subject to any disclaimer, the term of this patent is extended or adjusted under 35 U.S.C. 154(b) by 330 days.

(21) Appl. No.: 11/577,796

(22) PCT Filed: Oct. 14, 2005

(86) PCT No.: PCT/JP2005/018938

§ 371 (c)(1),
(2), (4) Date: Apr. 23, 2007

(87) PCT Pub. No.: WO2006/049004

PCT Pub. Date: May 11, 2006

(65) Prior Publication Data

US 2009/0071248 A1   Mar. 19, 2009

(30) Foreign Application Priority Data

Nov. 8, 2004 (JP) .............................. 2004-323761

(51) Int. Cl.
  *G01P 15/12* (2006.01)
  *G01P 15/08* (2006.01)
(52) U.S. Cl. ................... 73/514.33; 73/514.38
(58) Field of Classification Search ............. 73/514.33, 73/514.34, 514.01, 497, 514.36, 514.38; 338/2
See application file for complete search history.

(56) References Cited

U.S. PATENT DOCUMENTS

| | | | | |
|---|---|---|---|---|
| 5,471,876 A | * | 12/1995 | Yano | 73/514.33 |
| 5,567,880 A | * | 10/1996 | Yokota et al. | 73/514.33 |
| 5,827,967 A | * | 10/1998 | Ueyanagi et al. | 73/514.33 |
| 6,892,578 B2 | * | 5/2005 | Saitoh et al. | 73/514.33 |
| 6,892,579 B2 | * | 5/2005 | Ohtoyo et al. | 73/514.33 |
| 7,111,514 B2 | * | 9/2006 | Hatano et al. | 73/514.33 |
| 2004/0226373 A1 | * | 11/2004 | Sakaguchi | 73/514.16 |
| 2007/0028687 A1 | * | 2/2007 | Hatano et al. | 73/514.01 |

FOREIGN PATENT DOCUMENTS

| | | | |
|---|---|---|---|
| JP | 3-67177 | A | 3/1991 |
| JP | 4-274005 | A | 9/1992 |
| JP | 5-223842 | A | 9/1993 |
| JP | 6-242141 | A | 9/1994 |
| JP | 7-244071 | A | 9/1995 |
| JP | 8-15300 | A | 1/1996 |
| JP | 8-105913 | A | 4/1996 |
| JP | 8-110351 | A | 4/1996 |
| JP | 8-160071 | A | 6/1996 |
| JP | 8-233851 | | 9/1996 |

* cited by examiner

*Primary Examiner*—Helen C. Kwok
(74) *Attorney, Agent, or Firm*—Sughrue Mion, PLLC

(57) ABSTRACT

An acceleration sensor device comprising: an acceleration sensor chip comprising a mass portion, a support frame and flexible arms having piezo-resistors on their top surfaces; and an upper regulation plate having an IC circuit, which is larger in area than the support frame, bonded to a top surface of the support frame; wherein the acceleration sensor chip and the upper regulation plate are placed in a protection case with a lid. The regulation plate protrudes from outside walls of the support frame to partition the space accommodating the chip in the protection case by the protrusion and to prevent air circulation above and below the regulation plate, so that a temperature rise due to the IC circuit among the piezo-resistors provided on the top surfaces of the flexible arms is kept uniform to reduce offset voltage.

3 Claims, 6 Drawing Sheets

ACCELERATION SENSOR DEVICE HAVING PIEZO-RESISTORS MEASURING ACCELERATION

TECHNICAL FIELD

The present invention relates to acceleration sensor devices for detecting acceleration, which are used for toys, automobiles, airplanes, portable terminal devices, and the like, and in particular to an acceleration sensor device which can be manufactured by using semiconductor technology.

BACKGROUND ART

Acceleration sensors utilizing physical quantity change such as piezo-resistance effect or capacitance change have been developed and commercialized. Although these acceleration sensors can be widely used in various fields, there has recently been a demand for a smaller acceleration sensor capable of highly sensitively detecting acceleration in multi-axial directions at the same time.

Silicon single crystals have features: they can be an ideal elastic body because of their extremely few lattice defects, they can utilize semiconductor process technology without modification, and the like. Thus, particular attention is paid to semiconductor acceleration sensors of piezo-resistance effect type, in which thin flexible arms are formed on a silicon single crystal substrate and outputs are provided by converting stresses applied to the thin flexible arms into electric signals by a strain gauge such as % a piezo-resistor.

There are used three axis acceleration sensors having beam-structural flexible arms that are made of thin portions of a silicon single crystal substrate, connect a mass portion in the center made of a thick portion of the silicon single crystal substrate to a peripheral frame, and have a plurality of piezo-resistors formed in each axis direction on a flexible arm. In order to sensitively detect small acceleration, flexible arms are made longer and thinner, and the mass portion that serves as a pendulum is made heavier. The fact that small acceleration can be detected has caused flexible arms to be broken because great impact makes the amplitude of a mass portion too large. Thus, in order not to break flexible arms having had a large impact, regulation plates are provided above and below an acceleration sensor to regulate the amplitude of a mass portion by the regulation plates.

Patent Document 1 and Patent Document 2 show that in order to control the gap between a regulation plate and a mass portion of an acceleration sensor chip to be a predetermined value, microballs having substantially the same diameter as the gap are mixed with adhesive, and the adhesive mixed with the microballs is used to bond the regulation plate to the acceleration sensor chip. Since the gap between the regulation plate and the acceleration sensor chip can be determined by the diameter of a microball, the gap can be kept at the predetermined value. In this way, by using adhesive containing microballs, the gap between a regulation plate and an acceleration sensor chip can be controlled.

Piezo-resistors formed adjacent to a mass portion and adjacent to a support frame, respectively, on a flexible arm constitute a bridge circuit to measure each axial component of acceleration applied from the outside. The output voltage of the bridge circuit is as small as several mV to several 10 mV. Thus, a circuit for amplifying output voltage is required in order to address a wide range of application fields. Moreover, as for the output of a piezo-resistor, a temperature sensor for the piezo-resistor is needed to be located adjacent to an acceleration sensor to calibrate or compensate the output of the acceleration sensor with the output of the temperature sensor.

Thus, for example, Patent Document 3 proposes that an IC circuit including a bridge circuit, an amplifier circuit, and a temperature compensation circuit be incorporated in an upper regulation plate.

When an upper regulation plate having an IC circuit is used, heat generated by the IC circuit increases the temperature of the upper regulation plate. Since the upper regulation plate having the IC circuit is made of silicon, and the thermal conductivity of silicon is 168 w/m·K which is about 7000 times as large as that of air, 0.0241 w/m·K, the overall upper regulation plate is warmed by the heat generated by the IC circuit.

Piezo-resistors provided for an acceleration sensor chip are disposed on the top surfaces of flexible arms, that is, at locations opposite to the bottom surface of an upper regulation plate, at a small gap of several μm to several 10 μm from the bottom surface of the upper regulation plate, and hence when the temperature of the upper regulation plate increases, the temperature of the piezo-resistors is increased caused by radiant heat from the bottom surface of the upper regulation plate. The temperature of a piezo-resistor at a location corresponding to the center of the upper regulation plate, that is, adjacent to the mass portion, becomes lower or higher than the temperature of a piezo-resistor adjacent to the support frame. Since movement of air adjacent to the periphery of the acceleration sensor chip is larger than that of air at a center portion of the acceleration sensor chip, the temperature of a piezo-resistor formed adjacent to the support frame tends to vary from the temperature of a piezo-resistor formed adjacent to the mass portion. Since the piezo-resistors adjacent to the support frame and the piezo-resistors adjacent to the mass portion on the flexible arm are incorporated into the bridge circuit to measure each axial component of acceleration, if there is a temperature difference between the piezo-resistors adjacent to the support frame and the piezo-resistors adjacent to the mass portion, the temperature causes a resistance difference between them, and hence even when no acceleration is applied, an output voltage is measured. Specifically, there has been a problem that offset voltage is large.

Patent Document 1: Japanese Patent Laid-Open No. 4-274005

Patent Document 2: Japanese Patent Laid-Open No. 8-233851

Patent Document 3: Japanese Patent Laid-Open No. 6-242141

DISCLOSURE OF THE INVENTION

Problems to be Solved by the Invention

Therefore, the present invention has an object to provide an acceleration sensor device having small offset voltage.

Means for Solving the Problems

An acceleration sensor device according to the present invention includes:

an acceleration sensor chip including:

a mass portion in a center of the acceleration sensor chip;

a support frame at a distance from and surrounding the mass portion;

a plurality of flexible arms bridging a top surface of the mass portion and a top surface of the support frame; and piezo-resistors for measuring each axial component of acceleration, formed adjacent to the mass portion and adjacent to the support frame on a top surface of each of the plurality of flexible arms;

an upper regulation plate made of a silicon substrate having an IC circuit on its top surface, disposed at a predetermined gap from the top surface of the mass portion to cover a top surface of the acceleration sensor chip and bonded to the support frame by adhesive; and a protection case housing the acceleration sensor chip with the upper regulation plate disposed on the top surface of the acceleration sensor chip, and the upper regulation plate is so larger than a periphery of the support frame as to protrude from at least one of outside walls of the support frame to cover the support frame.

It is preferable that in the acceleration sensor device according to the present invention, the support frame have on a side top surface of the support frame a terminal board having a plurality of terminals that are connected to the piezo-resistors and to processing circuit terminals on the upper regulation plate by lead wires, and the upper regulation plate protrude from all the outside walls of the support frame other than that at the side top surface on which the terminal board is located.

It is preferable that in the acceleration sensor device according to the present invention, a gap between an inside wall of the protection case and a side of the upper regulation plate protruding from the outside wall of the support frame be 0.1 to 0.8 in a ratio to a gap between the inside wall of the protection case and the outside wall of the support frame.

It is preferable that in the acceleration sensor device, the upper regulation plate be bonded to four corners of the support frame of the acceleration sensor chip by adhesive, and a temperature sensor be provided at a location on the upper regulation plate corresponding to one of the four corners.

Advantages of the Invention

In an acceleration sensor device according to the present invention, an upper regulation plate protrudes from outside walls of a support frame of an acceleration sensor chi to partition the space accommodating the acceleration sensor chip in a protection case by the protrusion and to prevent air circulation above and below the upper regulation plate. Therefore, a temperature rise, due to an IC circuit, between the piezo-resistors disposed adjacent to a mass portion and the piezo-resistors disposed adjacent to a support frame on the top surface of a flexible arm can be kept uniform to reduce offset voltage. Moreover, the upper regulation plate causes damping effect to reduce the damping period of oscillation for rapid acceleration changes. Further, when chipping occurs in a silicon substrate forming the upper regulation plate, since the upper regulation plate is larger than the acceleration sensor chip, the chips from the silicon substrate are seldom involved in the sensor. Moreover, the gap between a side of the upper regulation plate and an inside wall of the protection case is small and, furthermore, the upper regulation plate and the protection case are joined by lead wires. Thus, it is also expected that the heat of the upper regulation plate can easily be transmitted to the protection case and released.

EXPLANATION OF REFERENCE NUMERALS

Figure 1:
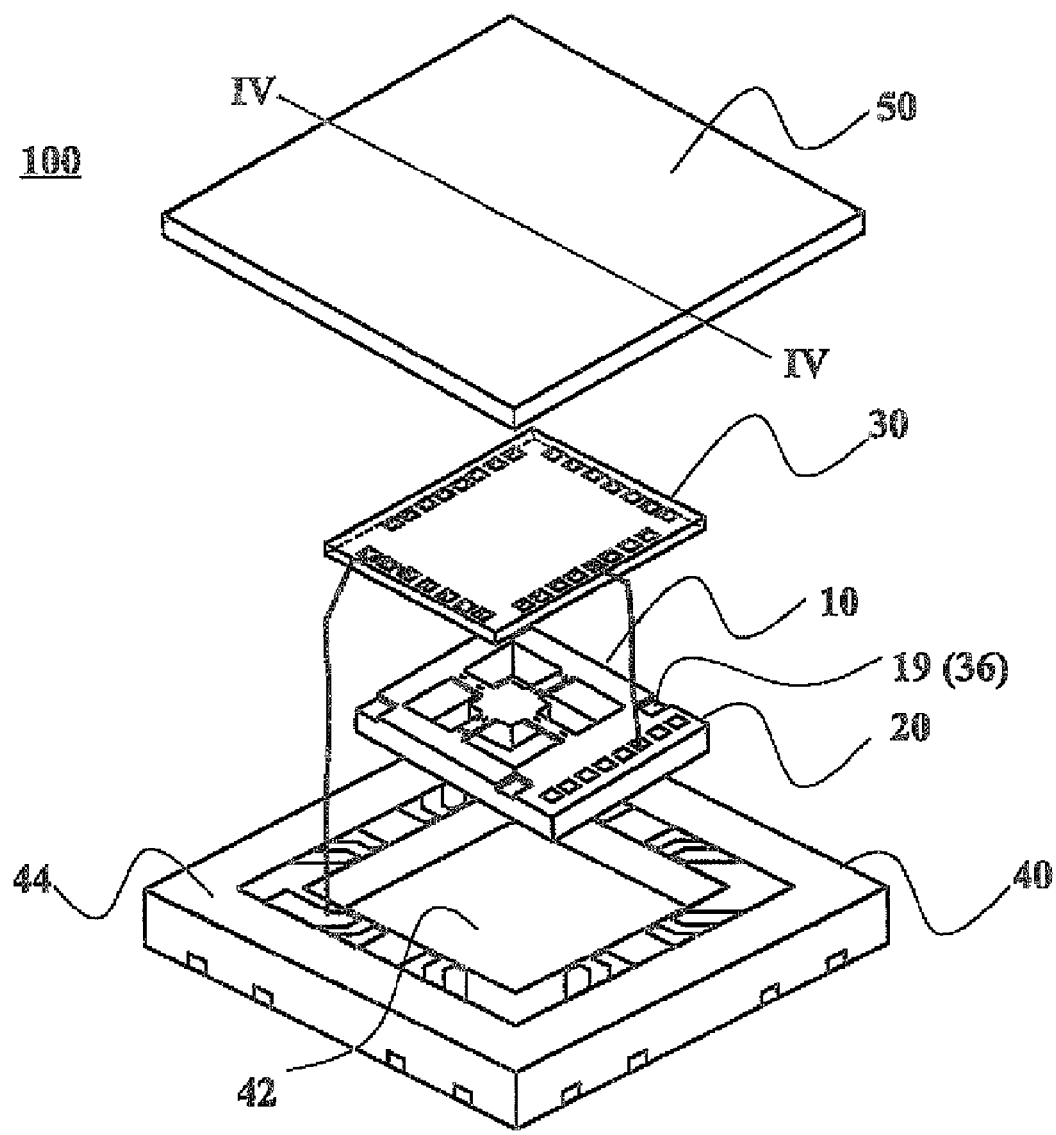
FIG. 1 is an exploded perspective view of an acceleration sensor device of EXAMPLE 1 according to the present invention.

10 Acceleration sensor chip
12 Mass portion
14 Support frame
16 Flexible arm
18 Piezo-resistor
19 Corner
20 Terminal board
22 Terminal
30 Upper regulation plate
32 Processing circuit terminal
34 Temperature sensor
36 Adhesive
40 Protection case
100 Acceleration sensor device

BEST MODE FOR CARRYING OUT OF THE INVENTION

The present invention will be described in detail below based on EXAMPLES with reference to drawings.

Example 1

Figure 2:
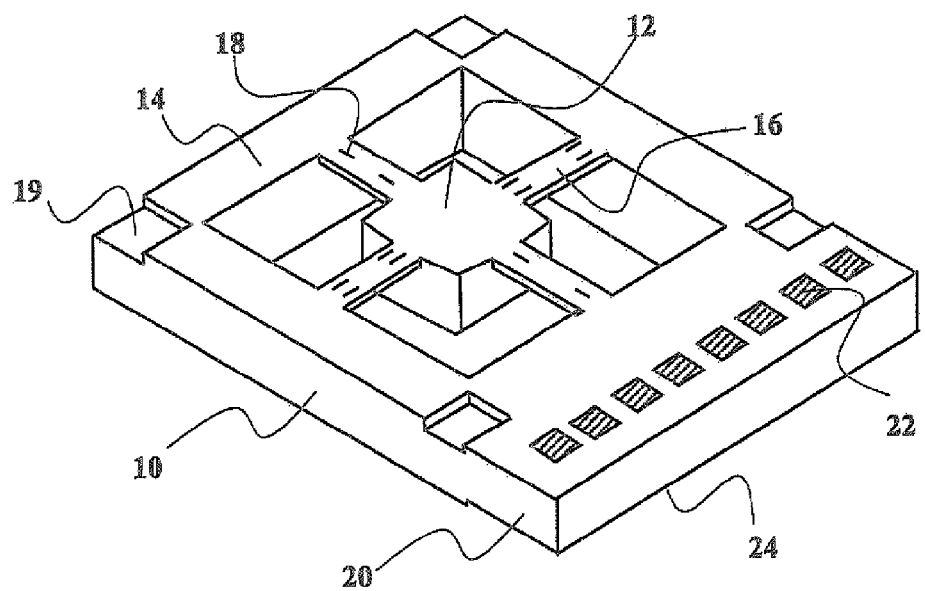
FIG. 2 is a perspective view of an acceleration sensor chip used in the acceleration sensor device of EXAMPLE 1.
Figure 3:
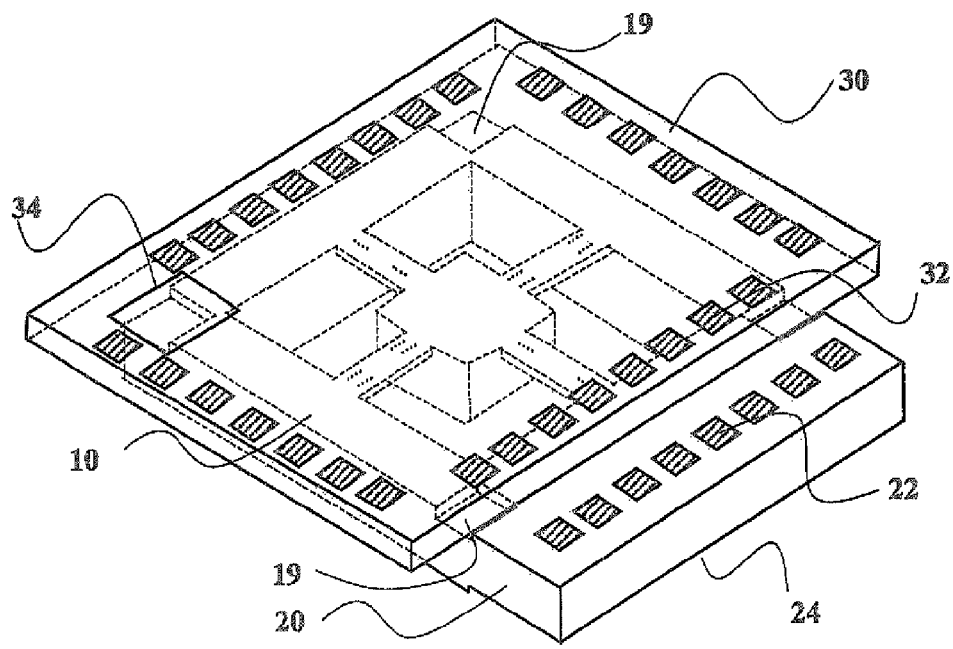
FIG. 3 is a perspective view of the acceleration sensor chip with an upper regulation plate mounted in the acceleration sensor device of EXAMPLE 1.
Figure 4:
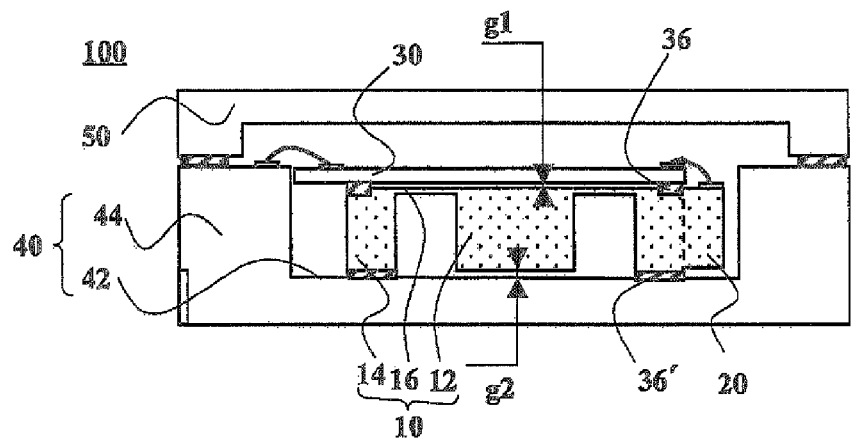
FIG. 4 is a cross-sectional view taken along a line IV-IV of FIG. 1.
Figure 5:
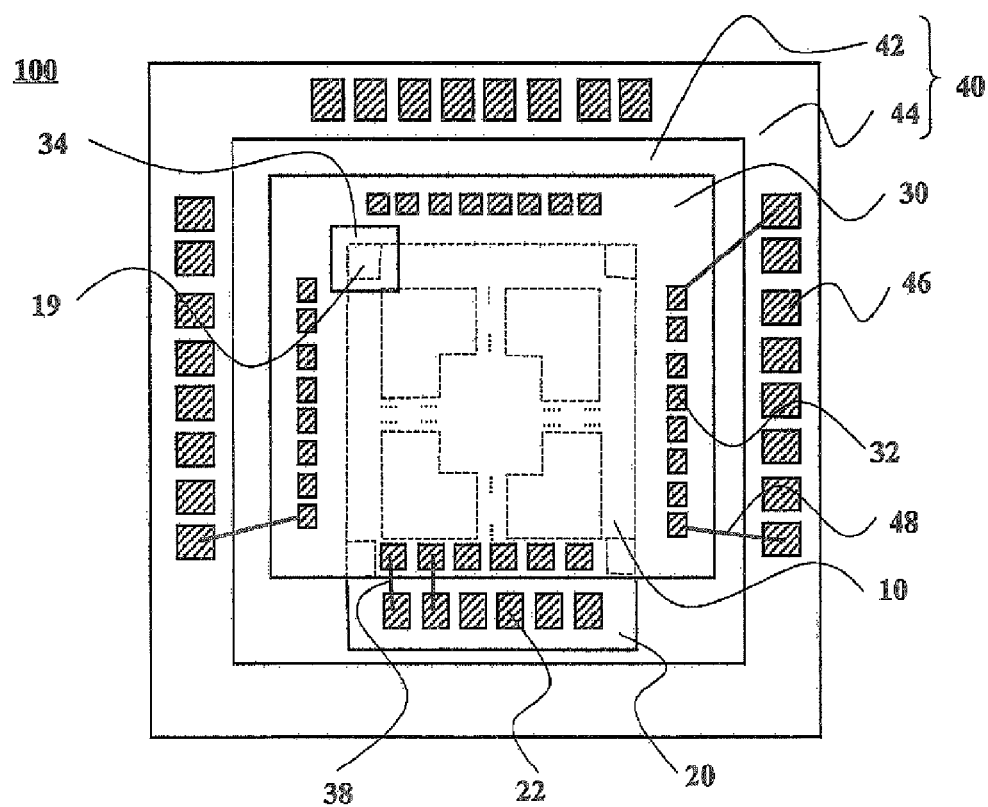
FIG. 5 is a plan view of the acceleration sensor device of EXAMPLE 1 with a lid removed.

An acceleration sensor device of EXAMPLE 1 according to the present invention will be described with FIG. 1 to FIG. 5. FIG. 1 is an exploded perspective view of the acceleration sensor device of EXAMPLE 1; FIG. 2 is a perspective view showing an acceleration sensor chip used in the acceleration sensor device of EXAMPLE 1; FIG. 3 is a perspective view of the acceleration sensor chip with an upper regulation plate mounted thereon; FIG. 4 is a cross-sectional view taken along a line IV-IV of FIG. 1; and FIG. 5 is a plan view showing the acceleration sensor device of FIG. 1 with a lid removed. In the acceleration sensor device 100 of EXAMPLE 1, the upper regulation plate 30 with its circuit mounting surface on the top is bonded to the top surface of the acceleration sensor chip 10 by mixed and kneaded adhesive 36 containing about 10 wt % of rigid plastic balls (20 μm in diameter) and the acceleration sensor chip 10 is inserted and bonded in a protection case 40. To bond the acceleration sensor chip 10 in the protection case 40, mixed and kneaded adhesive 36' containing rigid plastic balls was applied in advance to an adhesive portion of a bottom surface 42 in the protection case. About 10 wt % of rigid plastic balls of 10 μm in diameter was mixed in a silicone resin to produce the adhesive 36'. The rigid plastic balls control a gap g1, between the upper regulation plate 30 and the acceleration sensor chip 10, and a gap g2, between the bottom surface 42 in the protection case and the acceleration sensor chip 10, to be 10 μm with high accuracy.

The acceleration sensor chip 10 used in the present invention is manufactured by using a silicon single crystal substrate having an SOI layer formed via a $SiO_2$ insulating layer, that is, by using an SOI wafer so as to control thicknesses of flexible arms 16 with high accuracy. SOI stands for Silicon On Insulator. In this example, there was used as a substrate a wafer in which a $SiO_2$ insulating layer serving as an etching stopper was thinly (about 1 μm) formed on a Si wafer of about 600 μm in thickness and an n-type silicon single crystal substrate of about 10 μm in thickness was formed on the insulating layer. The acceleration sensor chip 10 includes a mass portion 12 in the center made of a thick portion of the silicon single crystal substrate; a square support frame 14 disposed at the periphery of the mass portion 12 so as to surround the mass portion 12; two pairs of flexible arms 16 each in a beam form, made of thin portions of the silicon single crystal substrate, linking the top surface of the mass portion 12 to the top surface of the support frame 14; and four strain gauges (in the following description, referred to as "piezo-resistors" because a piezo-resistor is used as an example of the strain gauge) 18 set on the flexible arms for each axis, corresponding to two orthogonal detection axes (X and Y axes) and a detection axis (Z axis) perpendicular to the top surface of the acceleration sensor chip. Specifically, flexible arms 16 extended in the X-axis directions each have two piezo-resistors 18 disposed thereon to detect acceleration in the X-axis directions. Flexible arms 16 extended in the Y-axis directions each have two piezo-resistors 18 disposed thereon to detect acceleration in the Y-axis directions. The flexible arms 16 extended in the X-axis directions each have two more piezo-resistors 18 disposed thereon to detect acceleration in the Z-axis directions. In this example, the acceleration in the Z-axis directions is detected by the piezo-resistors disposed on the flexible arms 16 extended in the X-axis directions; however, the piezo-resistors for detecting the acceleration in the Z-axis directions may be disposed on the flexible arms 16 extended in the Y-axis directions. The four piezo-resistors for detecting acceleration in each-axis directions constitute a full bridge detection circuit. The piezo-resistors were formed by patterning the surface of an SOI wafer (on the silicon of 10 μm in thickness with photoresist and implanting (1 to 3)×$10^{18}$ atom/$cm^3$ of boron in the silicon layer. The wiring of the resistors was formed by using a metal sputter, a dry etching device, and the like.

The size of the acceleration sensor chip 10 will be described here. The support frame 14 of the acceleration sensor chip has an outer dimension of 1900 μm×1900 μm; its thickness is 610 μm; and the width of the support frame is 200 μm. The mass portion 12 in the center has length and width measurements of 500 μm×500 μm; and its thickness is 610 μm. The four flexible arms 16 are each 500 μm in length×70 μm in width×10 μm in thickness. The piezo-resistors 18 formed on the flexible arms are each 70 μm in length and 5 μm in width.

One side of the support frame 14 of the acceleration sensor chip 10 has a terminal board 20, on which a plurality of terminals 22 for piezo-resistors are disposed, integrally formed with the acceleration sensor chip 10. Since the terminal board 20 has the same length (1900 μm) as that of the side of the support frame 14, and the protrusion measurement from the support frame 14 is about 200 μm, the size of the acceleration sensor chip 10 including the terminal board 20 is 1900 μm×2100 μm. It is preferable that the bottom surface 24 of the terminal board 20 be formed shallower than the bottom surface of the square support frame 14 so that the bottom surface 24 of the terminal board 20 does not come in contact with the bottom surface 42 in the protection case. The plurality of terminals 22 disposed on the terminal board 20 are connected to the terminals of the 12 piezo-resistors 18 disposed on the flexible arms by a plurality of respective lead wires provided over the top surfaces of the flexible arms and the top surface of the support frame. In FIG. 1 to FIG. 5, these lead wires connecting the terminals 22 to the piezo-resistors 18 are omitted.

Since the 12 piezo-resistors 18 disposed on the acceleration sensor chip 10 constitute three pairs (one pair in each of X, Y, and Z axes) of full bridge detection circuits, at least four terminals 22 are required, and preferably eight terminals 22 are disposed on the terminal board 20. Each of the terminals 22 is electrically connected to each of some processing circuit terminals 32 disposed on the upper regulation plate 30 by a lead wire 38. By using, for example, a bare gold wire of 20 μm in diameter and 0.5 mm in length as the lead wire 38, one end of the bare gold wire is welded to each terminal 22 and the other end of the bare gold wire is welded to each processing circuit terminal 32 with an ultrasonic bonder.

On the top surface of the acceleration sensor chip 10, the upper regulation plate 30 is mounted so as to cover the top surface. A predetermined gap, for example, the gap g1 of 3 to 35 μm is provided between the bottom surface of the upper regulation plate 30 and the top surface of the mass portion 12 of the acceleration sensor chip 10. At each corner 19 of the top surface of the support frame 14 of the acceleration sensor chip 10, which is a square support frame in this EXAMPLE, the upper regulation plate 30 is fixed to the top surface of the acceleration sensor chip 10 by the adhesive 36.

The gap g1 is formed by forming a recess of 180 μm×180 μm in size and 10 μm in depth in the support frame at each corner 19, and applying the adhesive 36 in the recess so as to project the adhesive from the top surface of the support frame up to the bottom surface of the upper regulation plate 30.

As the upper regulation plate 30, a silicon substrate, which has an IC circuit formed on the top surface, of 2200 μm in width×2600 μm in length×200 μm in thickness was used. The upper regulation plate 30 was bonded on the acceleration sensor chip 10 so that sides of the upper regulation plate protrude from three outside walls of the support frame 14. As shown in FIG. 3 and FIG. 5, the upper regulation plate 30 protrudes by 300 μm from an outside wall of the support frame, opposite to the side on which the terminal board 20 is disposed, and protrudes by 350 μm from both sides of the support frame. On the side on which the terminal board is disposed, a side of the upper regulation plate 30 coincides with a side of the support frame 14 such that the overall top surface of the terminal board comes out.

The IC circuit disposed on the upper regulation plate 30 includes a multiplexer for switching input axes; an operational amplifier for amplifying signals; an EEPROM for storing correction data; a temperature sensor for detecting ambient temperature; and a resistor ladder having a function for providing feedback for the offset and the gain of the operational amplifier by providing an adjustment code from the EEPROM based on the output of the temperature sensor. A temperature sensor 34 is disposed on the upper regulation plate corresponding to one of the locations where the upper regulation plate 30 is bonded at the four corners 19 of the support frame 14.

On the bottom surface of the upper regulation plate 30, a $SiO_2$ layer is formed as an insulating layer. The bottom surface of the upper regulation plate is provided with the insulating layer for preventing leakage of electric charge from the bottom surface of the upper regulation plate to the acceleration sensor chip because the mass portion 12 of the acceleration sensor chip 10 may come in contact or collide with the bottom surface of the upper regulation plate when large acceleration acts on the acceleration sensor device. As this insulating layer, an $Al_2O_3$ layer may be used instead of a $SiO_2$ layer. Alternatively, instead of the insulating layer of the bottom surface of the upper regulation plate, the top surface of the acceleration sensor chip may be provided with an insulating layer.

The protection case 40 has a side frame 44 and an inner bottom surface 42, and the bottom surface of the support frame of the acceleration sensor chip 10 is bonded on the inner bottom surface 42 of the protection case 40. The mass portion 12 in the center of the acceleration sensor chip 10 is not in contact with the inner bottom surface 42 of the protection case 40 and has the predetermined gap g2 (this gap may have a length different from the gap between the top surface of the mass portion and the upper regulation plate), while the acceleration sensor chip 10 is fixed to the inner bottom surface 42. The inner bottom surface 42 functions as a lower regulation plate because the inner bottom surface 42 is at a gap from the bottom surface of the mass portion 12 to limit downward oscillation of the mass portion 12 within the size of the gap.

A distance across the side frame 44 of the protection case 40, that is, a distance between inside walls of the side frame 44 was set at 2900 μm. The acceleration sensor chip 10 is mounted at the center of the inner bottom surface 42 of the protection case 40. Since at both sides of the support frame 14, the upper regulation plate 30 protrudes from each outside wall of the support frame by 350 μm, a first side gap between an inside wall of the protection case and a side of the upper regulation plate is 150 μm. The ratio of the first side gap, between the inside wall of the protection case and the side of the upper regulation plate, to the second side gap of 500 μm, between the inside wall of the protection case and the outside wall of the support frame, is 0.3. Moreover, a distance between the side of the upper regulation plate on the side opposite to the terminal board 20 and an inside wall of the protection case is 200 μm, and a distance between the side of the terminal board (the lower side on the page in FIG. 5) and the inside wall of the protection case is 300 μm.

The side frame 44 of the protection case 40 has a plurality of input and output terminals 46, and some of the processing circuit terminals 32 disposed on the upper regulation plate 30 are electrically connected to these input and output terminals 46, respectively, by lead wires 48 (also referred to as "second lead wires"). Next, the terminals 46 are respectively connected to a plurality of external terminals disposed on the side of the protection case 40 by lead wires (not shown) in the side frame. The protection case 40 has at least five and preferably 12 input and output terminals 46. As the second lead wires 48 electrically connecting the input and output terminals 46 of the protection case 40 to the processing circuit terminals 32 of the upper regulation plate, bared gold wires of 20 μm in diameter are used, and ends of the wires are welded to the respective terminals with the ultrasonic bonder. The protection case 40 is formed of, for example, alumina ceramic, and a lid 50 made of alumina ceramic is fixed to the top portion of the protection case 40 by adhesive.

The acceleration sensor device 100 of EXAMPLE 1 was used to measure its offset voltage. When a voltage of 3 V was applied across the terminals of the fall bridge circuit formed from the four piezo-resistors for the X axis and of the full bridge circuit formed from the four piezo-resistors for the Z axis and the offset voltage was measured at an ambient temperature of 24° C., the output voltage of the full bridge circuit for the X axis was within ±20 mV, and the output voltage of the full bridge circuit for the Z axis was also within ±20 mV. Note that the output voltage indicates a positive value and a negative value, and thus comparison has to be made with the magnitude of the absolute value. In this case, "within ±20 mV" means that the output voltage of a full bridge circuit indicates distributed values ranging from +20 mV to −20 mV. Specifically, this means that the absolute value of an offset voltage is up to 20 mV. Offset voltage will be shown below with the same meaning.

As an acceleration sensor device of a comparative example, there was provided an acceleration sensor device having the same structure as that of the acceleration sensor device 100 of EXAMPLE 1 except that an upper regulation plate having a size of 1900 μm in width×1900 μm in length× 200 μm in thickness was used. Since the upper regulation plate had the same outer dimension as that of the acceleration sensor chip, when the upper regulation plate was mounted on the acceleration sensor chip, the upper regulation plate did not protrude from any outside walls of the support frame. When the acceleration sensor device of the comparative example was used to measure the offset voltage as in the case of EXAMPLE 1, the output voltage of the full bridge circuit for the X axis was within ±30 mV, and the output voltage of the fall bridge circuit for the Z axis was within ±60 mV. In this way, the acceleration sensor device of the comparative example had large offset voltage for the Z axis; however, the acceleration sensor device of EXAMPLE 1 had small offset voltage, which was up to ±20 mV, for Z axis.

Among circuits provided for the upper regulation plate, a circuit generating large heat, such as an amplifier, is disposed on a peripheral portion on the upper regulation plate; that is, a circuit generating large heat is provided near a piezo-resistor on a flexible arm adjacent to the support frame. Therefore, the temperature of a piezo-resistor adjacent to the support frame becomes higher than that of a piezo-resistor adjacent to the mass portion. In the full bridge circuit formed from the four piezo-resistors for measuring acceleration for the Z axis, an output voltage is obtained from the difference between the product of resistance values of two piezo-resistors adjacent to the support frame and the product of resistance values of two piezo-resistors adjacent to the mass portion. On the other hand, in the full bridge circuit formed from four piezo-resistors for measuring acceleration for the X axis or Y axis, the output voltage is obtained from the difference between the product of the resistance value of one of two piezo-resistors adjacent to the support frame and the resistance value of one of two piezo-resistors adjacent to the mass portion and the product of the resistance value of the other piezo-resistor adjacent to the support frame and the resistance value of the other piezo-resistor adjacent to the mass portion. Therefore, when a temperature difference exists between a piezo-resistor adjacent to the support frame and a piezo-resistor adjacent to the mass portion, the output voltage of the full bridge circuit for the Z axis appears to undergo a large change and the output voltage of the full bridge circuit for the X axis or Y axis appears to undergo a small change.

In an acceleration sensor device according to the present invention, the upper regulation plate protrudes from outside walls of the acceleration sensor chip to cover the space accommodating the acceleration sensor chip in the protection case. When heat generated by the IC circuit disposed on the upper regulation plate heats either the peripheral space on the top surface of the support frame or the peripheral space on the top surface of the mass portion, the heat appears to uniformly heat the top surface of the acceleration sensor chip in a short time. However, in the comparative example, since the first side gap between an inside wall of the protection case and a side of the upper regulation plate is large, a lot of air can circulate between the space accommodating the acceleration sensor chip and the space above the upper regulation plate in the protection case, the overall top surface of the acceleration sensor chip is not uniformly heated, thus the temperature difference appears to exist between a piezo-resistor adjacent to the support frame and a piezo-resistor adjacent to the mass portion, and the offset voltage for the Z axis became large.

Note that in the acceleration sensor device 100 of EXAMPLE 1, the temperature sensor 34 is disposed on the upper regulation plate 30 corresponding to one of the four corners 19 of the support frame 14 bonding the upper regulation plate. Although the operational amplifier, the resistance ladder, and the like generating relatively large heat are formed on the upper regulation plate, since the locations where the upper regulation plate is bonded are away from these circuits generating large heat, the temperature sensor 34 can measure the average temperature in the protection case.

Example 2

Figure 6:
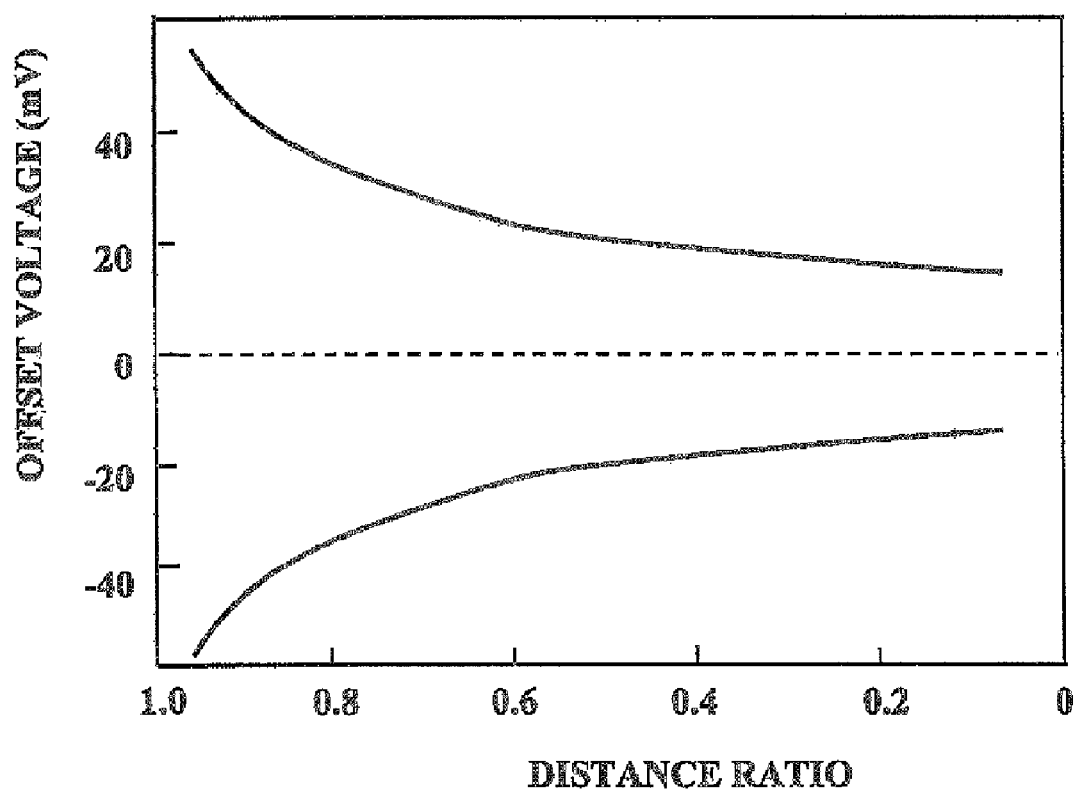
FIG. 6 is a graph showing the relationship between offset voltage and a distance ratio.

The relationship between the offset voltage and the distance ratio was measured by using an acceleration sensor device according to the present invention, in which the size of the upper regulation plate is changed, and the ratio of the first side gap, between an inside wall of the protection case and a side of the upper regulation plate, to the second side gap, between the inside wall of the protection case and an outside wall of the support frame, is changed. Acceleration sensor devices used herein are the same as that of EXAMPLE 1 except for the sizes of the upper regulation plates. In the upper regulation plates, L of the size of 2200 μm in width×L μm in length×200 μm thickness was changed from 1900 μm up to 2800 μm. The upper regulation plate protrudes by 300 μm from the outside wall of the support frame on the side opposite to the side on which the terminal board is disposed because the upper regulation plate is bonded on the acceleration sensor chip so that on the side, of the acceleration sensor chip, on which the terminal board of the acceleration sensor chip is disposed, a side of the upper regulation plate coincides with a side of the support frame of the acceleration sensor chip such that the overall top surface of the terminal board comes out of the upper regulation plate. Since the length L of the upper regulation plates is changed from 1900 μm up to 2800 μm, the upper regulation plates protrude from both sides of the support frame by 0 μm (no protrusion measurement), 100 μm, 200 μm, 300 μm, 400 μm, and 450 μm, respectively. The ratios of the first side gap, between an inside wall of the protection case and a side of the upper regulation plate, to the second side gap of 500 μm, between the inside wall of the protection case and an outside wall of the support frame, are 1.0, 0.8, 0.6, 0.4, 0.2, and 0.1, respectively. The offset voltage of these acceleration sensor devices was measured by applying a voltage of 3 V across the terminals at an ambient temperature of 24° C. The relationship between the measured offset voltage and a distance ratio (ratio of the first side gap between an inside wall of the protection case and a side of the upper regulation plate to the second side gap between the inside wall of the protection case and an outside wall of the support frame) is shown in FIG. 6. As is clear from FIG. 6, when the distance ratio is 0.1 to 0.8, the offset voltage is within .+−.40 mV. Moreover, when the distance ratio is 0.1 to 0.6, the offset voltage is within .+−.30 mV. Note that when the distance ratio is less than 0.1, the first side gap between an inside wall of the protection case and a side of the upper regulation plate becomes less than 50 μm, so that it becomes difficult to assemble an acceleration sensor device, and thus the distance ratio is needed to be 0.1 or more.

Example 3

Figure 7:
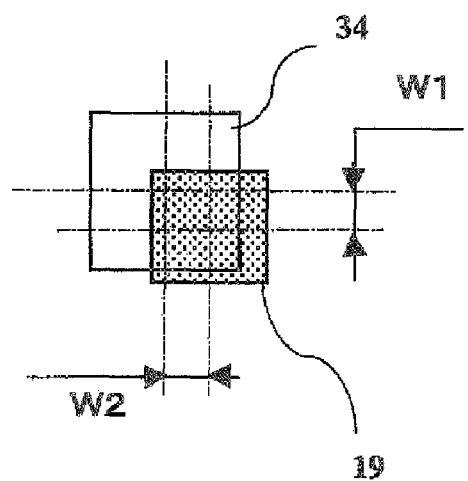
FIG. 7 is an explanatory view of locations of a temperature sensor.
Figure 8:
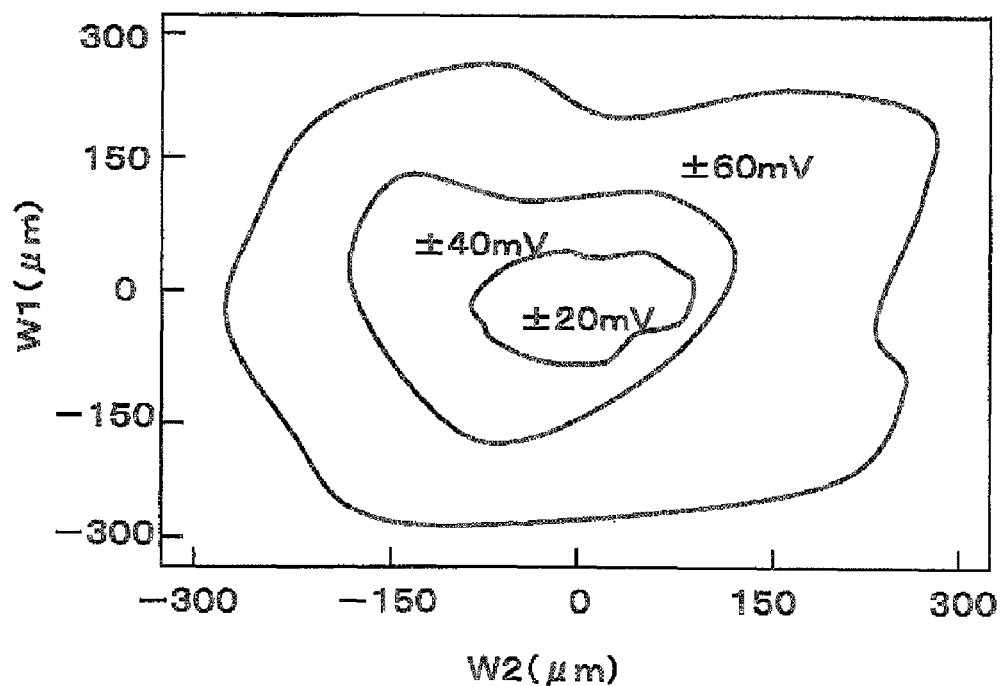
FIG. 8 is a graph showing the relationship between offset voltage and a location of the temperature sensor.

The relationship between a location of the temperature sensor disposed on the upper regulation plate and the offset voltage was considered. Acceleration sensor devices used herein have the constitution as described in EXAMPLE 1, and the temperature sensor 34 is disposed on the upper regulation plate corresponding to one of the locations where the upper regulation plate is bonded at the four corners of the support frame. When the center of a temperature measuring portion (size of 300 μm×300 μm) of the temperature sensor 34 was changed in a to-and-fro direction by a distance of W1 and in a right-and-left direction by a distance of W2 up to 300 μm as shown in FIG. 7 from the center of the corner 19 having a recess with the size of 180 μM×180 μm containing adhesive, the offset voltage was measured, and the distribution of the offset voltage is shown in FIG. 8. As seen from FIG. 8, when the center of the temperature measuring portion of the temperature sensor is an area within ±50 μm from the center of the adhesive, the offset voltage becomes less than ±20 mV, and as the center of the temperature measuring portion of the temperature sensor is farther away from the center of the adhesive, the offset voltage becomes larger.

Since the IC circuit is formed on the top surface of the upper regulation plate, when the temperature sensor is provided at a location closer to the center of the upper regulation plate from the center of the adhesive, the temperature sensor becomes so close to the IC circuit that it becomes impossible to measure the temperature of an piezo-resistor. Moreover, when the temperature sensor is located closer to the outside of the upper regulation plate from the adhesive, the sensor appears to be away from a piezo-resistor, and thus the offset voltage became large.

Example 4

Figure 9:
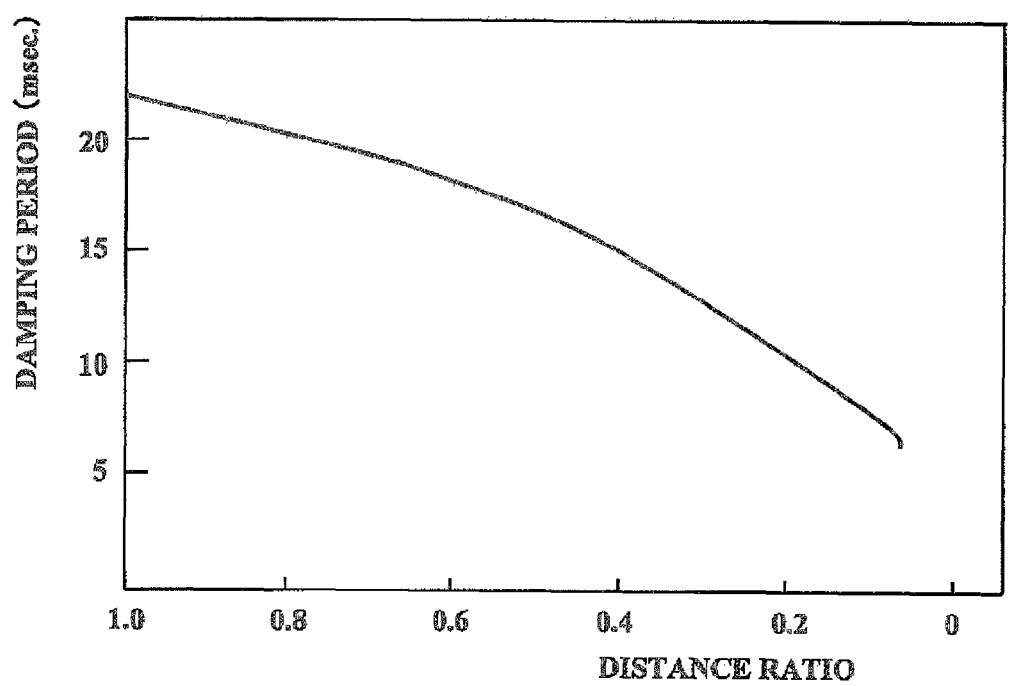
FIG. 9 is a graph showing the relationship between a damping period and a distance ratio.

By using the acceleration sensor devices used in EXAMPLE 2 which were made by changing the length L of the upper regulation plate, the period until the oscillation of the acceleration sensor chip was damped down (damping period) was measured. When an acceleration sensor device was hung by thread and the thread was cut to make the sensor device free fall so that the acceleration changed from 1 G to 0 G, the output of the acceleration sensor device was monitored, and the period until no output was monitored was defined as the damping period. The relationship between a measured damping period and the distance ratio of an acceleration sensor device (the ratio of the first side gap between an inside wall of the protection case and a side of the upper regulation plate to the second side gap between the inside wall of the protection case and the outside wall of the support frame) is shown in FIG. 9 with a graph. As is clear from this graph, as the distance ratio decreases, the damping period decreases, and compared with the damping period of about 22 msec when the distance ratio was 1.0 (protrusion measurement: 0 μm), the damping period when the distance ratio was 0.4 (protrusion measurements 200 μm), which was about 14 msec, was able to be reduced by about 40%.

INDUSTRIAL APPLICABILITY

In acceleration sensor devices for detecting acceleration applied to toys, automobiles, airplanes, portable terminal devices, and the like, it has been proposed that an IC circuit be formed on an upper regulation plate in order to reduce its size. Acceleration sensor devices with an upper regulation plate having an IC circuit formed thereon have had large offset voltage because piezo-resistors are not uniformly heated due to the heat generated by the IC circuit. In an acceleration sensor device in which the temperature of piezo-resistors is kept uniform by making an upper regulation plate larger than an acceleration sensor chip so that the upper regulation plate protrudes from the acceleration sensor chip, since the offset voltage can be reduced, acceleration to be measured can be a correct value.

The invention claimed is:

1. An acceleration sensor device comprising:
   an acceleration sensor chip comprising:
      a mass portion in a center of the acceleration sensor chip;
      a support frame spaced a distance from and surrounding the mass portion;
      a plurality of flexible arms bridging a top surface of the mass portion and a top surface of the support frame; and
      piezo-resistors, which measure each axial component of acceleration, said piezo-resistors being formed adjacent to the mass portion and adjacent to the support frame on a top surface of each of the plurality of flexible arms;
   an upper regulation plate made of a silicon substrate,
      said silicon substrate having an IC circuit and processing circuit terminals formed on a top surface thereof,
      wherein the upper regulation plate is disposed at a predetermined gap from the top surface of the mass portion to cover a top surface of the acceleration sensor chip, and
      wherein the upper regulation plate is bonded to the support frame by adhesive; and
   a protection case, which houses the acceleration sensor chip with the upper regulation plate disposed on the top surface of the acceleration sensor chip,
      wherein the support frame has a terminal board on a side top surface of the support frame protruding from a side of the upper regulation plate,
      wherein the terminal board has a plurality of terminals, which are connected by lead wires to both the piezo-resistors and to the processing circuit terminals on the upper regulation plate, and
         wherein the upper regulation plate is larger than a periphery of the support frame, and protrudes beyond all outside walls of the support frame except an outside wall on which the terminal board is located at the side top surface thereof and covers the support frame.

2. An acceleration sensor device as set forth in claim 1, wherein a first side gap is formed between an inside wall of the protection case and a side of the upper regulation plate beyond the outside wall of the support frame,
   wherein a second side gap is formed between the inside wall of the protection case and the outside wall of the support frame, and
   wherein the ratio of the first side gap to the second side gap is in the range of 0.1 to 0.8.

3. An acceleration sensor device as set forth in claim 2, wherein the upper regulation plate is bonded to four corners of the support frame of the acceleration sensor chip by adhesive, and a temperature sensor is provided at a location on the upper regulation plate corresponding to one of the four corners of the support frame.

* * * * *